United States Patent
Smyth et al.

(10) Patent No.: US 9,792,079 B2
(45) Date of Patent: Oct. 17, 2017

(54) SMART DRAG AND DROP USER INTERFACES FOR PRINT WORKFLOW SYSTEM

(71) Applicants: Patrick Smyth, Thornton, CO (US); Kumar V. Kadiyala, Boulder, CO (US); Ikuo Inouchi, Kanagawa (JP); Joan Stagaman Goddard, Boulder, CO (US)

(72) Inventors: Patrick Smyth, Thornton, CO (US); Kumar V. Kadiyala, Boulder, CO (US); Ikuo Inouchi, Kanagawa (JP); Joan Stagaman Goddard, Boulder, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/776,326

(22) Filed: Feb. 25, 2013

(65) Prior Publication Data

US 2014/0240754 A1    Aug. 28, 2014

(51) Int. Cl.
*G06F 15/00* (2006.01)
*G06F 3/12* (2006.01)

(52) U.S. Cl.
CPC .......... *G06F 3/1204* (2013.01); *G06F 3/1275* (2013.01); *G06F 3/1282* (2013.01)

(58) Field of Classification Search
None
See application file for complete search history.

(56) References Cited

U.S. PATENT DOCUMENTS

| | | | |
|---|---|---|---|
| 7,382,479 B2 | 6/2008 | Hirose et al. | |
| 7,665,028 B2 | 2/2010 | Cummins et al. | |
| 7,924,444 B2 | 4/2011 | Takahashi | |
| 2006/0044612 A1* | 3/2006 | Kayama | 358/1.15 |
| 2006/0080616 A1 | 4/2006 | Vogel et al. | |
| 2006/0092467 A1* | 5/2006 | Dumitrescu et al. | 358/1.15 |
| 2006/0136833 A1 | 6/2006 | Dettinger et al. | |
| 2007/0234226 A1 | 10/2007 | Szeto | |
| 2009/0041426 A1 | 2/2009 | Weber et al. | |
| 2009/0103128 A1* | 4/2009 | Maeda | G06F 3/1296 358/1.15 |
| 2011/0140857 A1* | 6/2011 | Hull et al. | 340/10.1 |
| 2011/0153051 A1* | 6/2011 | Bachman et al. | 700/96 |
| 2011/0181900 A1* | 7/2011 | Suese | 358/1.13 |
| 2012/0243028 A1* | 9/2012 | Dumitrescu et al. | 358/1.15 |
| 2013/0222829 A1* | 8/2013 | Nakashima | 358/1.13 |

* cited by examiner

*Primary Examiner* — Helen Q Zong
(74) *Attorney, Agent, or Firm* — Duft Bornsen & Fettig LLP

(57) ABSTRACT

Systems and methods are provided for generating workflows for printing systems. The system includes a memory that stores requirements for sequencing each of multiple activities available at a print shop into workflows. The system also includes a Graphical User Interface (GUI) able to graphically present a workflow. The workflow includes an ordered subset of the activities to perform for processing a print job. The GUI is further able to graphically present the available activities, and to enable a user to drag the available activities onto the workflow to alter the workflow. The system also includes a processing system able to detect an activity being dragged by a user, to determine locations in the workflow where requirements for the activity are met, and to operate the GUI to highlight the determined locations.

20 Claims, 8 Drawing Sheets

SMART DRAG AND DROP USER INTERFACES FOR PRINT WORKFLOW SYSTEM

FIELD OF THE INVENTION

The invention relates to the field of print workflow systems, and in particular, to Graphical User Interfaces (GUIs) for print workflow systems.

BACKGROUND

Print shops are typically medium or large scale facilities capable of supplying printing services to meet a variety of customer demands. For example, print shops are often used to print documents for mass-mailing (e.g., customer bills, advertisements, etc.). Because print shops engage in printing on a scale that is hard to match, their customer base is usually varied. Print shop customers may therefore include both large institutional customers (e.g., credit card companies and banks), and small customers (e.g., small businesses and churches).

Print shops are generally arranged to print incoming jobs from customers in a way that is economical, yet fast. Thus, print shops often include a number of high-volume printers capable of printing incoming jobs quickly and at high quality. Print shops also typically include post-printing devices that are used to process the printed documents of each job (e.g., stackers, staplers, cutters, binders, etc.). Print shops may also provide digital/web publishing, e-mail, or other multimedia services to customers. Because print shops serve a variety of customers, they are often tasked with processing jobs that have varying printing formats, delivery dates, and media requirements.

Each print job sent to the print shop is associated with a workflow, which is an ordered set of activities to perform at the print shop to transform the (electronic data of the) print job into a deliverable physical product for a customer. For example, workflow activities may include "pre-flighting" the print job to check for errors, rendering the print job, physically printing and drying the print job, proofing the printed job, and removing the print job from the system. Because print jobs typically request different types of processing, the specific workflow associated with a given print job may vary on a job-by-job basis.

Print workflow systems enable a user to define the type and order of activities to perform in a workflow for a print job. However, in a print shop, certain activities may have requirements that should be met in order for the activity to be properly performed. For example it may be important to perform certain activities in a certain order (e.g., a print job cannot be packaged for delivery before it has been printed). Since there are a vast number of possible workflow activities (e.g., hundreds), and each activity may have its own unique requirements, it remains a complicated process for a print shop operator to create a workflow that will not generate an error at the print shop. Thus, print shop operators continue to desire enhanced user interfaces that aid in the crafting of workflows for printing systems.

SUMMARY

Embodiments described herein enhance workflow systems that provide a drag and drop Graphical User Interface (GUI) to a user. The user may dynamically assemble the workflow by dragging and dropping workflow activities into the workflow. Furthermore, as an activity is dragged across the workflow by a user, the system can dynamically highlight locations where the requirements for the activity are met (i.e., locations where the activity can be placed without causing an error).

One embodiment is a system for generating workflows for printing systems. The system includes a memory that stores requirements for sequencing each of multiple activities available at a print shop into workflows. The system also includes a Graphical User Interface (GUI) able to graphically present a workflow. The workflow includes an ordered subset of the activities to perform for processing a print job. The GUI is further able to graphically present the available activities, and to enable a user to drag the available activities onto the workflow to alter the workflow. The system also includes a processing system able to detect an activity being dragged by a user, to determine locations in the workflow where requirements for the activity are met, and to operate the GUI to highlight the determined locations.

Another embodiment is a method for generating a workflow. The method includes accessing a memory that stores requirements for sequencing each of multiple activities available at a print shop into workflows, and graphically presenting, at a Graphical User Interface (GUI), a workflow that includes an ordered subset of the activities to perform for processing a print job. The method further includes graphically presenting the available activities, detecting that a user is dragging an available activity onto the workflow to alter the workflow, and determining locations in the workflow where requirements for the activity are met. The method further includes operating the GUI to highlight the determined locations.

Another embodiment comprises a non-transitory computer readable medium embodying programmed instructions which, when executed by a processor, are able to perform a method. The method includes accessing a memory that stores requirements for sequencing each of multiple activities available at a print shop into workflows, and graphically presenting, at a Graphical User Interface (GUI), a workflow that includes an ordered subset of the activities to perform for processing a print job. The method further includes graphically presenting the available activities, detecting that a user is dragging an available activity onto the workflow to alter the workflow, and determining locations in the workflow where requirements for the activity are met. The method further includes operating the GUI to highlight the determined locations.

Other exemplary embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
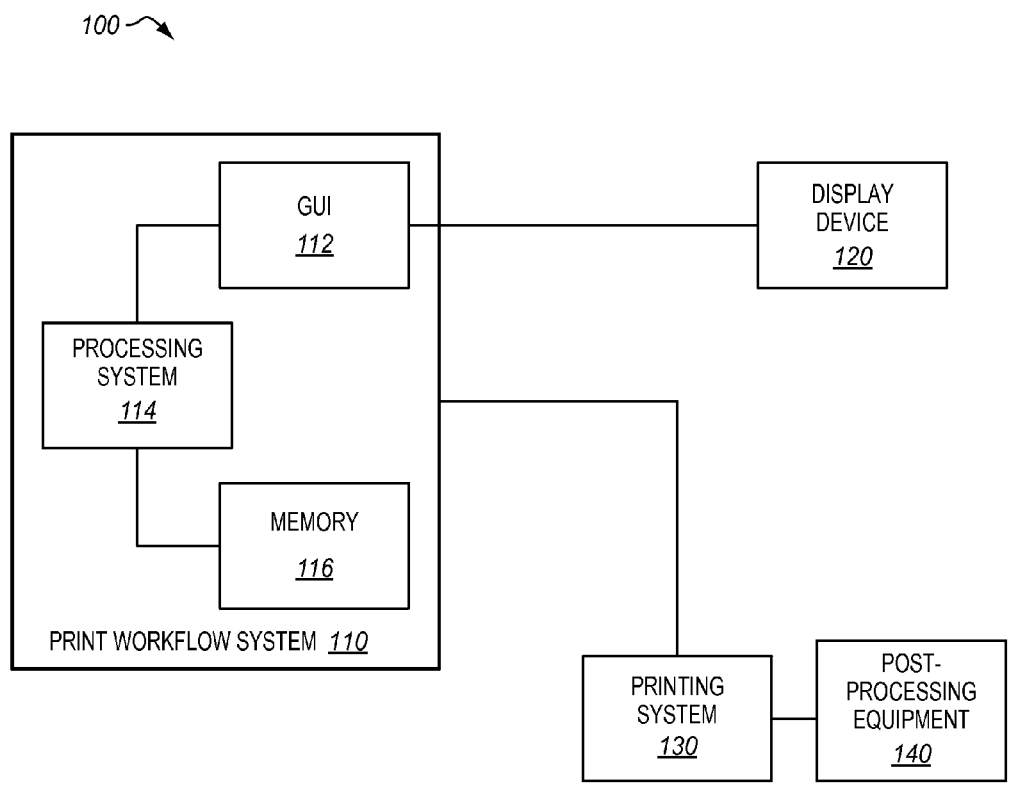
FIG. 1 is a block diagram of a print shop in an exemplary embodiment.

FIG. 1 is a block diagram of a print shop 100 in an exemplary embodiment. Print shop 100 includes printing system 130, as well as post-processing equipment 140. Printing system 130 comprises any devices and/or components that mark print media based on received print jobs from a customer. For example, printing system 130 may comprise a continuous-forms printing system. Post-processing equipment 140 performs operations on physically printed output from printing system 130. For example, post-processing equipment 140 may include cutters, stackers, inserters, staplers, binders, packagers, or other pieces of equipment.

Print shop 100 has been enhanced to include workflow system 110. Workflow system 110 allows a user to generate workflows for print jobs, where each workflow defines an ordered set of activities to perform to process the print job at the print shop. For example, a workflow may indicate that a print job should be rendered, then printed, and then cut before being delivered to a user. In print shops that have a varied customer base or a large number of print jobs being processed at a time, having a workflow for each print job ensures that each incoming print job will be processed as desired.

Workflow system 110 utilizes Graphical User Interface (GUI) 112, which graphically displays a workflow to a user for editing at display device 120 (e.g., a monitor, screen, television, projector, etc.). Processing system 114 manages the operations of GUI 112, and based on user input, can alter and store workflows in memory 116. These stored workflows can be associated with incoming jobs in order to direct how print shop 100 will process those jobs. Workflow system 110 includes a drag and drop interface at GUI 112 to manipulate the workflows that are presented on display device 120. This drag and drop interface has been enhanced so that when a user drags print shop activity to edit the workflow, GUI 112 highlights available locations in that workflow at which the activity can be placed.

Print workflow system 110 may be implemented, for example, as custom circuitry, as a special or general purpose processor executing programmed instructions stored in an associated program memory, or some combination thereof. While print workflow system 110 is illustrated as an independent element in FIG. 1, in some embodiments it may be integrated into a print server at print shop 100.

Illustrative details of the operation of print workflow system 110 will be discussed with regard to FIG. 2. Assume, for this embodiment, that a user has initialized workflow system 110, and has loaded an existing workflow from memory 116 into workflow system 110 for presentation at display device 120 via GUI 112.

Figure 2:
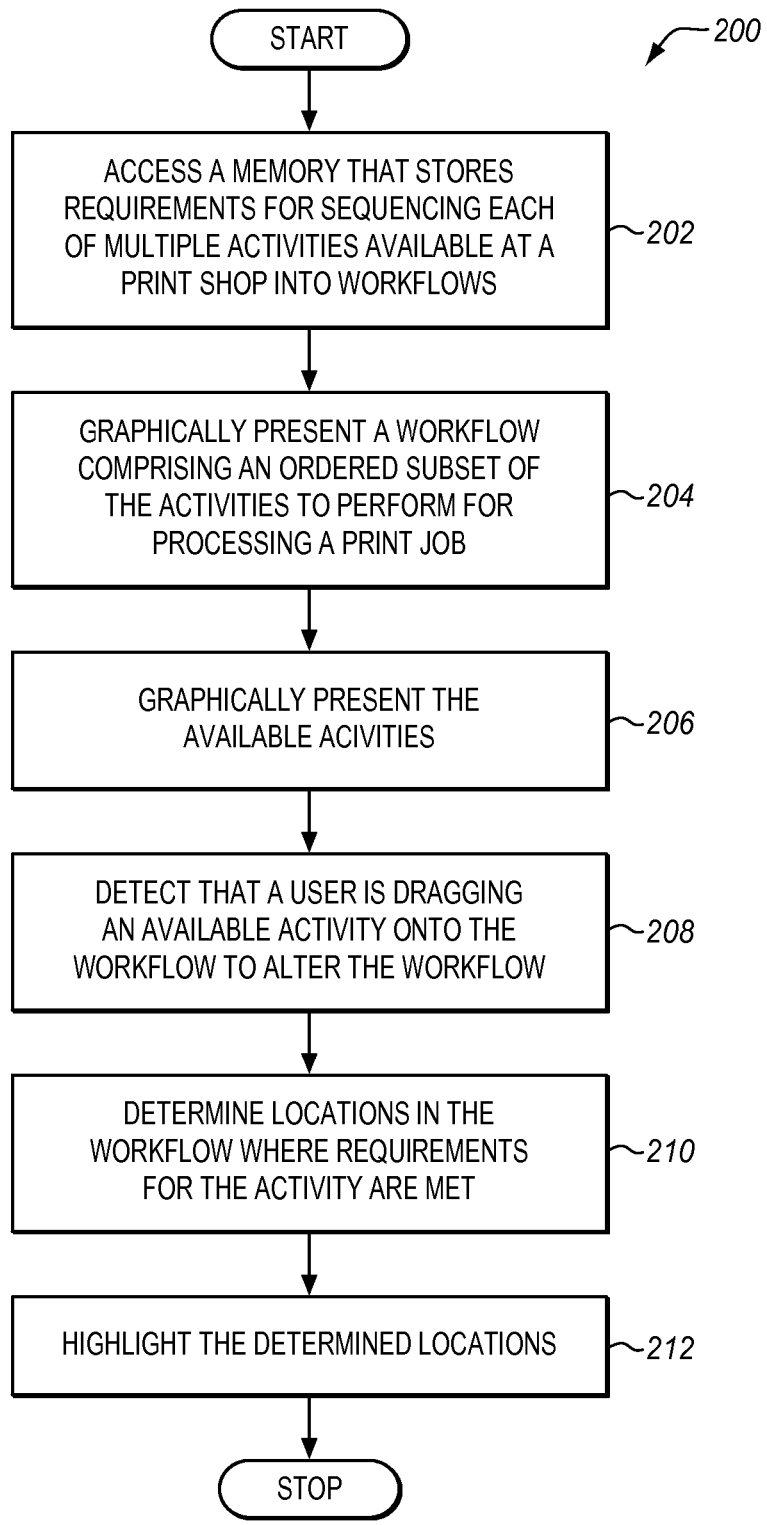
FIG. 2 is a flowchart illustrating a method for operating a workflow system for a print shop in an exemplary embodiment.

FIG. 2 is a flowchart illustrating a method for operating workflow system 110 for print shop 100 in an exemplary embodiment. The steps of method 200 are described with reference to workflow system 110 of FIG. 1, but those skilled in the art will appreciate that method 200 may be performed in other systems. The steps of the flowcharts described herein are not all inclusive and may include other steps not shown. The steps described herein may also be performed in an alternative order.

In step 202, processing system 114 accesses memory 116 to determine which activities are available at print shop 100. Processing system 114 also accesses memory 116 to determine requirements for sequencing each of the available print shop activities. A sequencing requirement for an activity indicates conditions that should be satisfied before (or after) the activity is performed. Requirements may indicate the maximum number of times that an activity can be used in a single workflow, may indicate pre-requisite activities that must be performed before the current activity, may indicate certain workflow phases in which to place the activity, etc. Activities may be performed by pieces of equipment in print shop 100 (e.g., cutters, stackers, staplers, etc.). Activities may even be performed by people within the print shop (e.g., activities such as pre-flight or proofing of a print job may be performed by a person at the print shop). Regardless of how each activity is actually performed, the information describing each activity and its corresponding requirements is stored in memory 116, and processed by workflow system 110 to generate workflows.

In step 204, processing system 114 operates GUI 112 to graphically present a workflow at display device 120. The workflow comprises an ordered subset of the available activities at the print shop that should be performed to properly process an incoming print job. For example, the ordered subset may comprise activities such as "receive print job," "print," "proof," and "complete job." Each of the activities is graphically displayed at the GUI, so that a user can understand, visually, the order in which workflow activities will be performed.

In step 206, processing system 114 operates GUI 112 to graphically present the available activities at the print shop. Thus, the available activities are presented at GUI 112, along with the workflow itself. These available activities may potentially be added to the workflow. The available activities may be presented at GUI 112 as a palette/set of graphical objects, where each graphical object corresponds with a specific workflow activity.

In step 208, processing system 114 detects that a user is dragging an available activity onto the workflow to alter the workflow. For example, a function call may inform processing system that the user has selected a graphical object for an activity (e.g., with a pointer such as a mouse or touch screen), and is physically dragging the graphical object for the activity across the GUI without releasing the pointer. As discussed herein, this act may be referred to simply as "dragging a workflow activity." In one embodiment, processing system 114 detects that a user is dragging a workflow activity when it detects an "On Click" event at a specific location within GUI 112, and may determine that the activity is still being dragged until it detects an "On Release" event.

While the activity is being dragged, processing system 114 may further track the location of the activity at the GUI (e.g., as a horizontal coordinate at the GUI, as a horizontal and vertical coordinate at the GUI, etc.).

In step 210, processing system 114 determines locations in the workflow where the requirements for the activity are met. In one embodiment, processing system 114 correlates locations on the GUI with chronological positions within the workflow. If an activity is dragged on the GUI between two activities that are already in the workflow, processing system 114 actively determines whether the dragged activity can be inserted into that chronological position in the workflow. In another embodiment, processing system 114 may analyze the entire workflow at once, and may determine each location in the workflow that the activity can be placed in.

In step 212, processing system 114 operates GUI 112 to highlight locations where the requirements for the activity have been met. Highlighting the locations may include changing the color of the location itself, adding a "ghosted" box into the workflow where the activity can be placed, changing the color/shape/visibility of the activity when it is dragged over a location in which it can be placed, etc.

Since GUI 112 presents information that shows where each activity can be dropped, the user may quickly assemble workflows without worrying about whether those workflows can be handled by print shop 100.

In a further embodiment, each workflow is divided into phases. Each phase is associated with multiple activities, and each phase is presented on GUI 112 with a different color. If an activity from is intended for placement within a given phase of the workflow, the activity as presented on the palette matches the color of the corresponding phase. Activities intended for placement in multiple phases may have a neutral color, such as grey.

EXAMPLES

In the following examples, additional processes, systems, and methods are described in the context of a workflow system for a print shop. Specifically, FIGS. 3-7 are block diagrams illustrating a Graphical User Interface (GUI) for generating and editing workflows for a workflow system in an exemplary embodiment.

Figure 3:
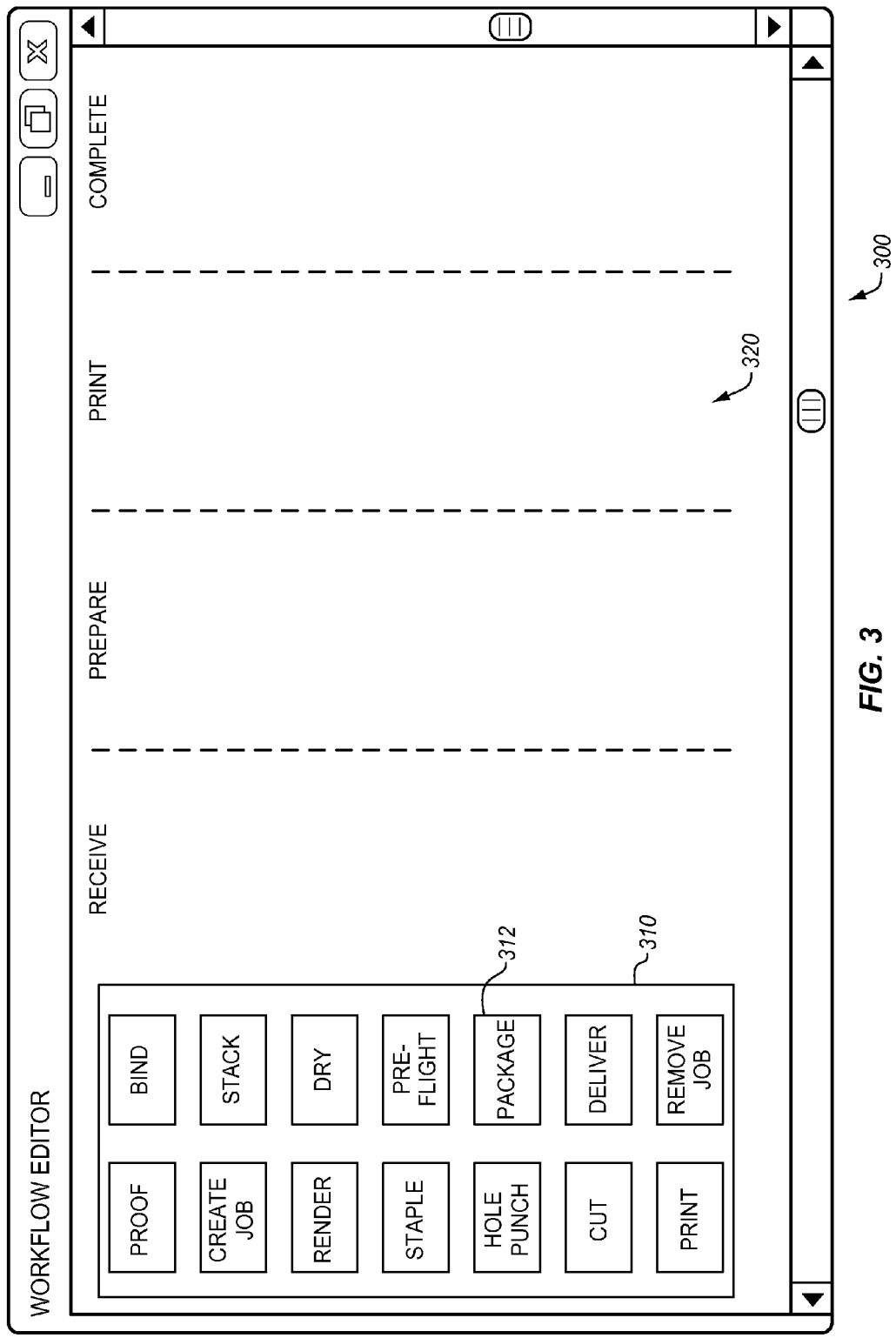
FIGS. 3-7 are block diagrams illustrating a Graphical User Interface (GUI) for generating and editing workflows for a workflow system in an exemplary embodiment.

FIG. 3 illustrates a window 300 that presents GUI 114 for print workflow system 110. According to FIG. 3, window 300 includes a palette 310 of print shop activities 312. Each activity may be dragged onto workspace 320 in order to assemble and/or edit a workflow. In this embodiment, the workflows that are assembled will each include four separately defined phases (RECEIVE, PREPARE, PRINT, and COMPLETE). However, it is not necessary for any generated workflow to include an activity in each phase.

Figure 4:
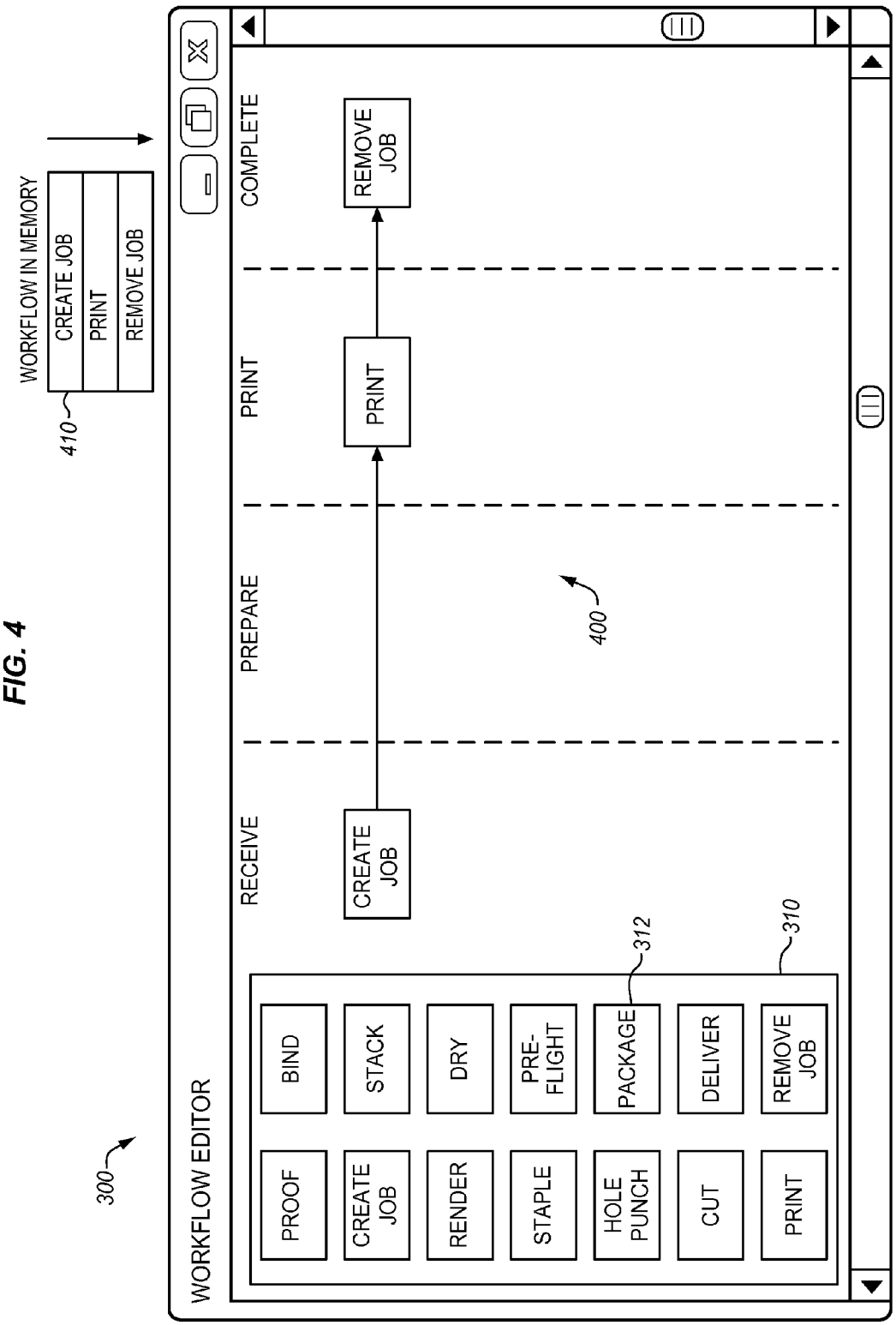

FIG. 4 illustrates window 300, where a workflow 400 has been created. Workflow 400 currently includes only three activities as graphically represented. Note that, at the time workflow 400 is presented graphically, an ordered list 410 of the activities for this workflow is stored by processing system 114 in memory.

Figure 5:
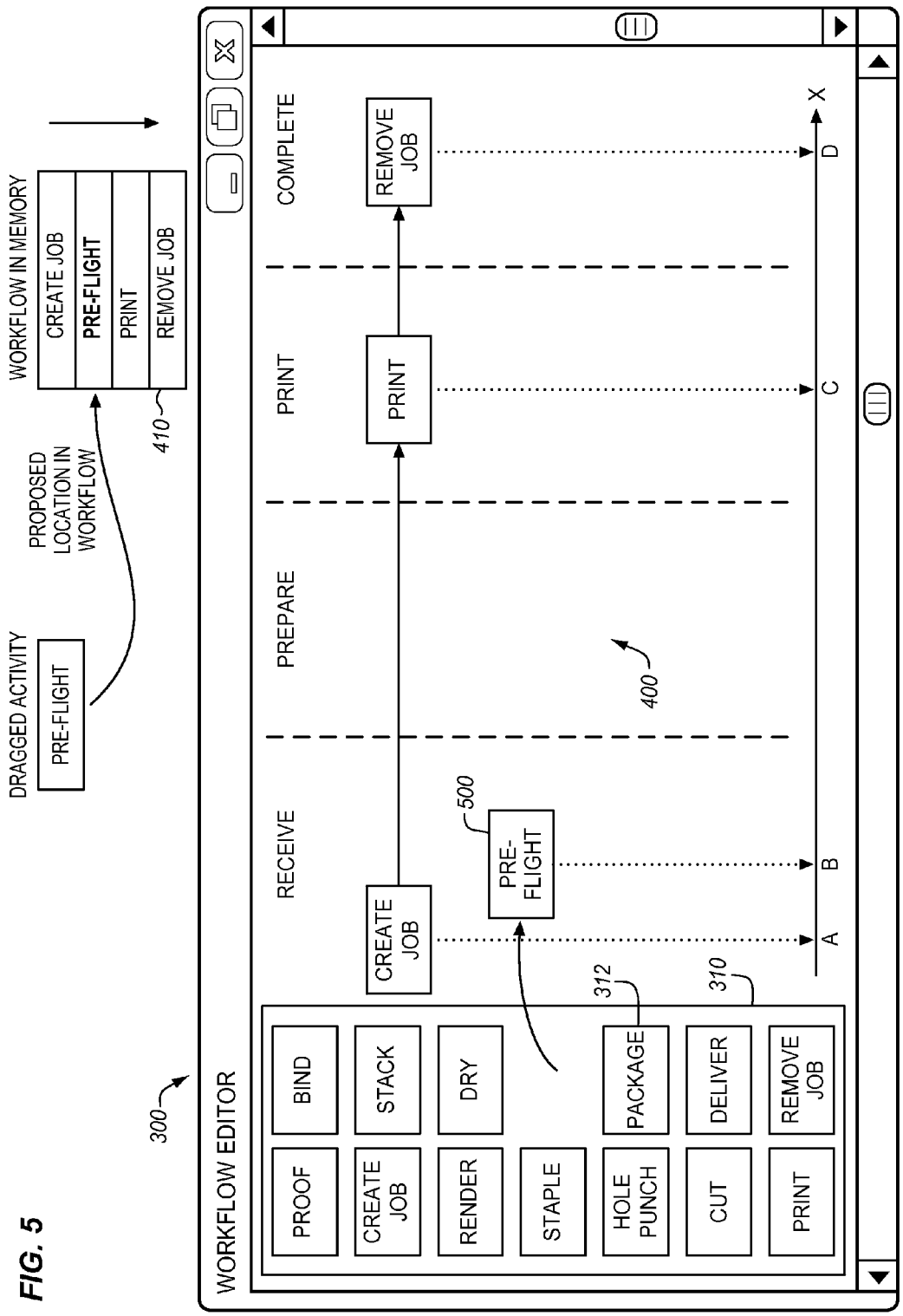

In FIG. 5, a user selects "pre-flight" activity 500 from the palette, and starts to drag activity 500 along workflow 400. At this time, processing system 114 tracks the horizontal locations of each of the workflow activities as presented on GUI 112. For example, the "create job" activity is at coordinate A, activity 500 is currently dragged to coordinate B, the "print" activity occupies coordinate C, and the "remove job" activity occupies coordinate D. Based on the determined horizontal positions of the various activities, processing system 114 determines a proposed location for activity 500 in the workflow. The proposed location is between the "create job" activity and the "print" activity. This all occurs while the activity is still being dragged by the user.

Processing system 114 then reviews requirements for the activity to see if the requirements have been met. For example, requirements for an activity may indicate that the activity is a post-printing activity and therefore should not be placed before a printing activity. In one embodiment, transform activities used to convert an incoming data stream to Portable Document Format (PDF) can only be placed in a prepare phase of the workflow. In another embodiment, a retain activity can only be placed in a complete phase, and must be placed in the workflow before a remove activity.

Figure 6:
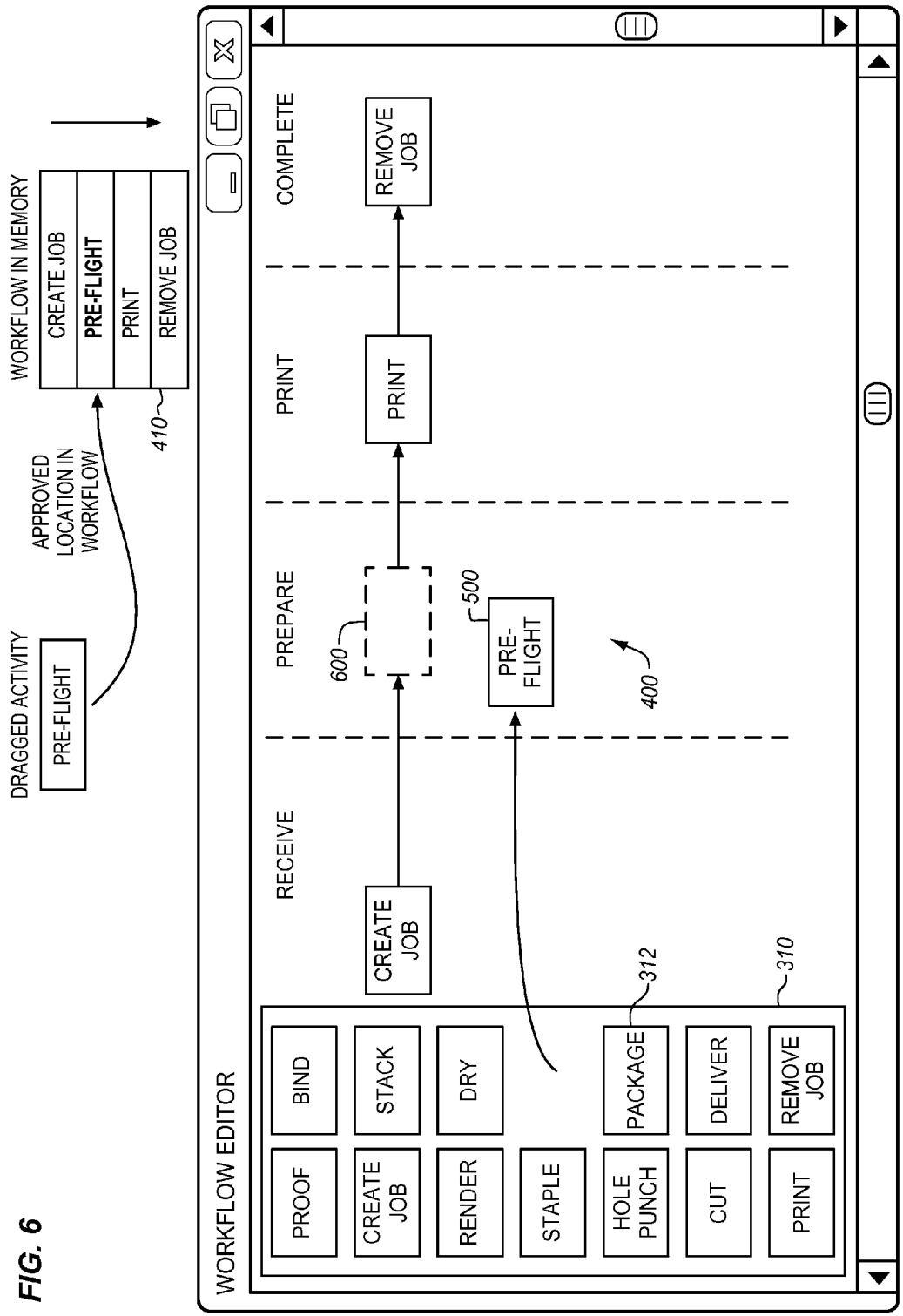

In FIG. 6, processing system 114 determines that, if activity 500 was placed in the proposed location, the requirements for the activity would be met. Therefore, processing system 114 operates GUI 112 to highlight the current location of activity 500 in the workflow. Here, "ghost" box 600 is created to indicate that activity 500 can be dropped into the workflow at this location. If the user drops the activity in this location, then list 410 for workflow 400 is updated to include activity 500 in the proposed location, and GUI 112 is updated appropriately.

Figure 7:
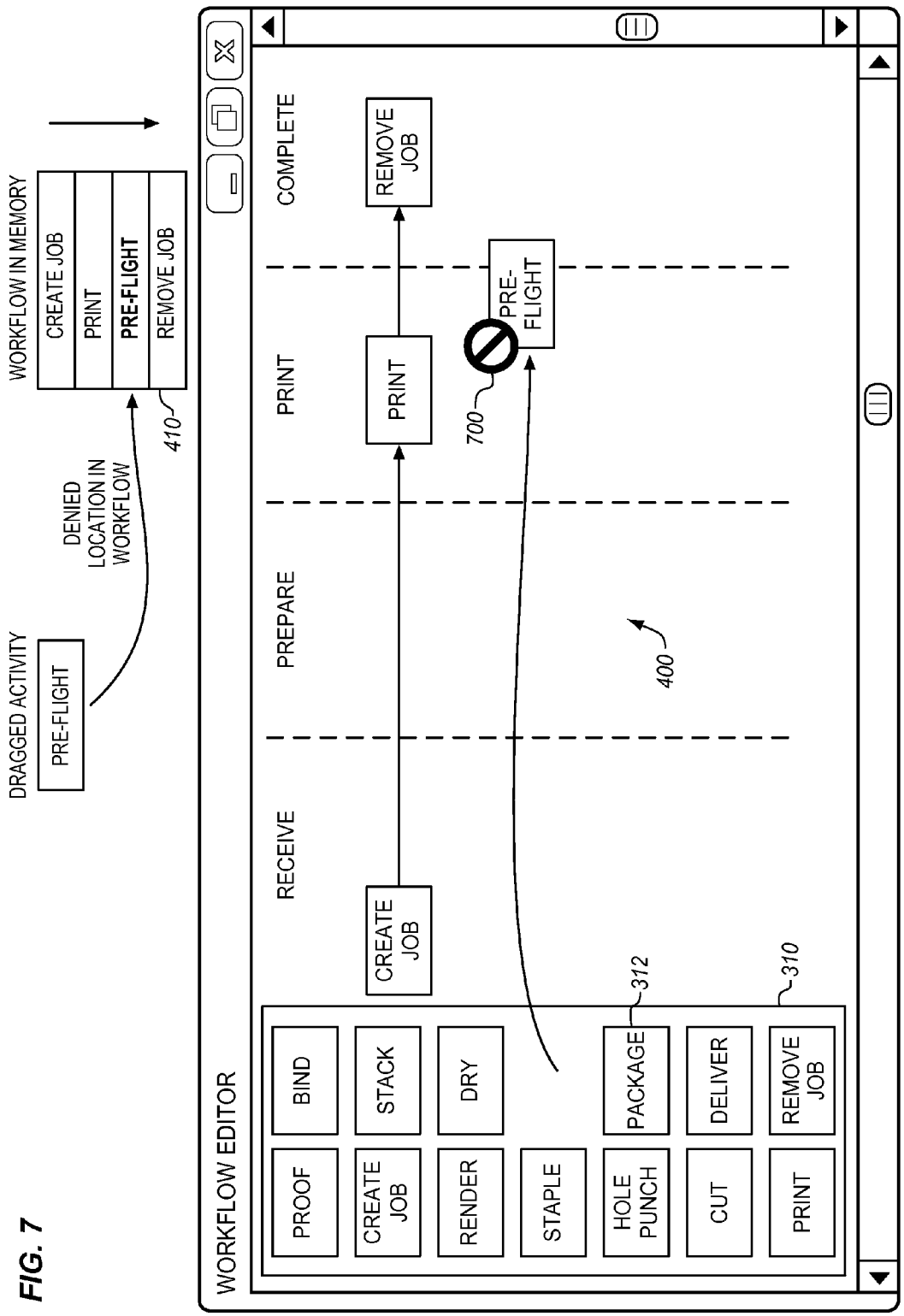

FIG. 7 illustrates a situation where a workflow activity is dragged to a location where its requirements are not met. In this case, an alert such as a graphical indicator or textual message is presented to the user to indicate that the activity cannot be placed in the current proposed location. In this embodiment, the alert comprises a graphical indicator 700 which is added to the graphical object that represents the activity that is being dragged. If the user releases their mouse/pointer at this time, then the activity is returned to the palette without modifying workflow 400. This prevents the user from accidentally modifying workflow 400 in a manner that would cause problems at the print shop.

Figure 8:
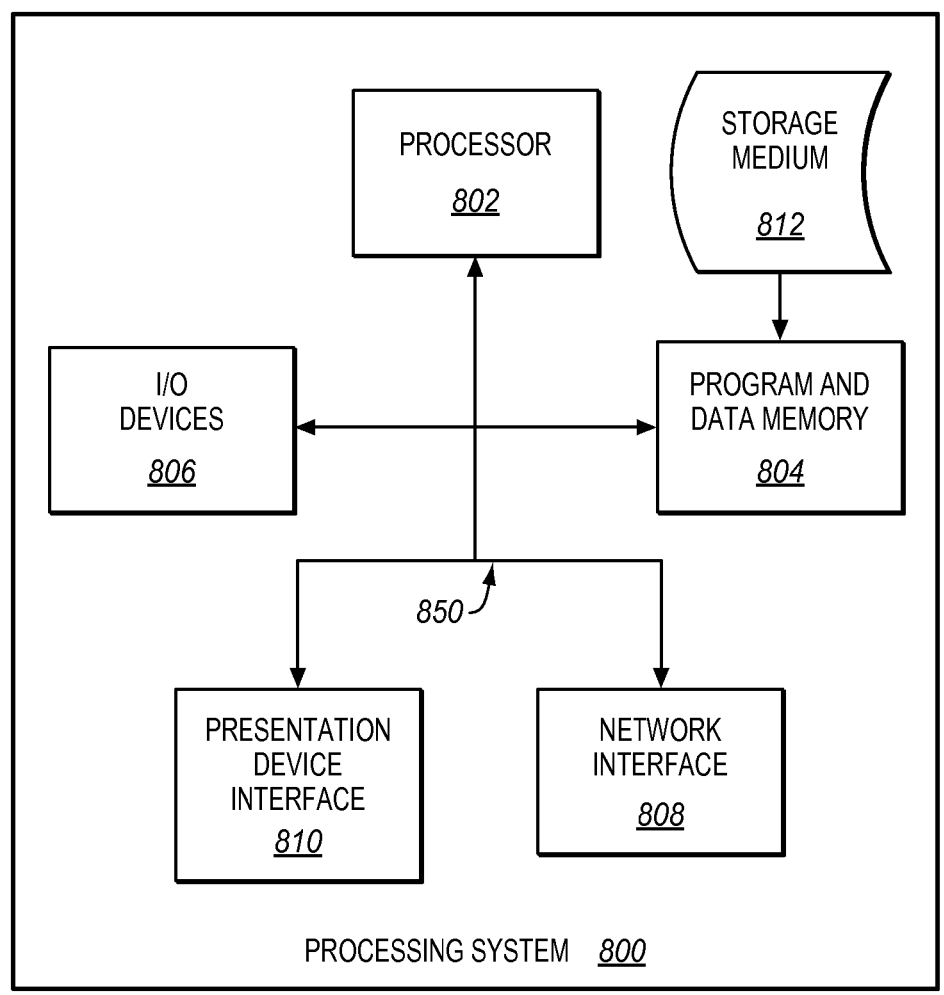
FIG. 8 illustrates a processing system operable to execute a computer readable medium embodying programmed instructions to perform desired functions in an exemplary embodiment.

Embodiments disclosed herein can take the form of software, hardware, firmware, or various combinations thereof. In one particular embodiment, software is used to direct a processing system of print workflow system 110 to perform the various operations disclosed herein. FIG. 8 illustrates a processing system 800 operable to execute a computer readable medium embodying programmed instructions to perform desired functions in an exemplary embodiment. Processing system 800 is operable to perform the above operations by executing programmed instructions tangibly embodied on computer readable storage medium 812. In this regard, embodiments of the invention can take the form of a computer program accessible via computer-readable medium 812 providing program code for use by a computer or any other instruction execution system. For the purposes of this description, computer readable storage medium 812 can be anything that can contain or store the program for use by the computer.

Computer readable storage medium 812 can be an electronic, magnetic, optical, electromagnetic, infrared, or semiconductor device. Examples of computer readable storage medium 812 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 800, being suitable for storing and/or executing the program code, includes at least one processor 802 coupled to program and data memory 804 through a system bus 850. Program and data memory 804 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 806 (including but not limited to keyboards, displays, pointing devices, etc.) can be coupled either directly or through intervening I/O controllers. Network adapter interfaces 808 may also be integrated with the system to enable processing system 800 to become coupled to other data processing systems or storage devices through intervening private or public networks. Modems, cable modems, IBM Channel attachments, SCSI, Fibre Channel, and Ethernet cards are just a few of the currently available types of network or host interface adapters. Presentation device interface 810 may be integrated with the system to interface to one or more presentation devices, such as printing systems and displays for presentation of presentation data generated by processor 802.

Although specific embodiments were described herein, the scope of the invention is not limited to those specific embodiments. The scope of the invention is defined by the following claims and any equivalents thereof.

We claim:

1. A system comprising:
a memory that stores requirements for sequencing each of multiple activities available at a print shop into workflows;
a Graphical User Interface (GUI) operable to graphically present a workflow comprising an ordered subset of the activities to perform for processing a print job, to graphically present the available activities wherein each activity comprises an operation performed upon a physical print job by a printer or post-printing device, and to enable a user to drag the available activities onto the workflow and drop the available activities onto the workflow in order to alter the workflow; and
a processing system operable to detect an activity being dragged by a user, to determine locations in the workflow where requirements for the activity are met while the activity is being dragged, and to operate the GUI to highlight the determined locations while the activity is being dragged.

2. The system of claim 1 wherein:
the processing system is further operable to determine a location of the activity on the GUI in relation to the workflow as the activity is dragged, to determine a chronological position of the activity in the workflow based on the location, and to operate the GUI to highlight the workflow at the location while the activity is being dragged, if the requirements for the activity would be met when placed in the workflow at the chronological position.

3. The system of claim 2 wherein:
the processing system is further operable to generate an alert at the GUI if the requirements for the activity would not be met when placed in the workflow at the chronological position.

4. The system of claim 1 wherein:
the requirements for the activity indicate a prerequisite activity to be performed before the activity.

5. The system of claim 1 wherein:
the requirements for the activity indicate a maximum number of instances of the activity allowed in a single workflow.

6. The system of claim 1 wherein:
the workflow is divided into multiple phases; and
the requirements for the activity indicate allowable phases in which to place the activity.

7. The system of claim 6 wherein:
the GUI presents each phase with a different color;
the GUI presents each activity with a color; and
activities may be placed within phases of matching color.

8. A method comprising:
accessing a memory that stores requirements for sequencing each of multiple activities available at a print shop into workflows;
graphically presenting, at a Graphical User Interface (GUI), a workflow comprising an ordered subset of the activities to perform for processing a print job wherein each activity comprises an operation performed upon a physical print job by a printer or post-printing device;
graphically presenting the available activities;
detecting that a user is dragging an available activity onto the workflow;
determining locations in the workflow where requirements for the activity are met while the activity is being dragged;
operating the GUI to highlight the determined locations while the activity is being dragged;
altering the workflow in response to detecting that a user has dropped the activity onto the workflow at a determined location.

9. The method of claim 8 further comprising:
determining a location of the activity on the GUI in relation to the workflow as the activity is dragged;
determining a chronological position of the activity in the workflow based on the location; and
operating the GUI to highlight the workflow at the location while the activity is being dragged, if the requirements for the activity would be met when placed in the workflow at the chronological position.

10. The method of claim 9 further comprising:
generating an alert at the GUI if the requirements for the activity would not be met when placed in the workflow at the chronological position.

11. The method of claim 8 wherein:
the requirements for the activity indicate a prerequisite activity to be performed before the activity.

12. The method of claim 8 wherein:
the requirements for the activity indicate a maximum number of instances of the activity allowed in a single workflow.

13. The method of claim 8 wherein:
the workflow is divided into multiple phases; and
the requirements for the activity indicate allowable phases in which to place the activity.

14. The method of claim 13 further comprising:
operating the GUI to present each phase with a different color; and
operating the GUI to present each activity with a color; wherein
activities may be placed within phases of matching color.

15. A non-transitory computer readable medium embodying programmed instructions which, when executed by a processor, are operable for performing a method comprising:
accessing a memory that stores requirements for sequencing each of multiple activities available at a print shop into workflows;
graphically presenting, at a Graphical User Interface (GUI), a workflow comprising an ordered subset of the activities to perform for processing a print job wherein each activity comprises an operation performed upon a physical print job by a printer or post-printing device;

graphically presenting the available activities;
detecting that a user is dragging an available activity onto the workflow;
determining locations in the workflow where requirements for the activity are met while the activity is being dragged;
operating the GUI to highlight the determined locations while the activity is being dragged;
altering the workflow in response to detecting that a user has dropped the activity onto the workflow at a determined location.

16. The medium of claim 15 wherein the method further comprises:
determining a location of the activity on the GUI in relation to the workflow as the activity is dragged;
determining a chronological position of the activity in the workflow based on the location; and
operating the GUI to highlight the workflow at the location while the activity is being dragged, if the requirements for the activity would be met when placed in the workflow at the chronological position.

17. The medium of claim 16 wherein the method further comprises:
generating an alert at the GUI if the requirements for the activity would not be met when placed in the workflow at the chronological position.

18. The medium of claim 15 wherein:
the requirements for the activity indicate a prerequisite activity to be performed before the activity.

19. The medium of claim 15 wherein:
the requirements for the activity indicate a maximum number of instances of the activity allowed in a single workflow.

20. The medium of claim 15 wherein:
the workflow is divided into multiple phases; and
the requirements for the activity indicate allowable phases in which to place the activity.

* * * * *